J. OLIVER.
Improvement in Apparatus for Amalgamating Gold and Silver
No. 132,919. Patented Nov. 12, 1872.

Witnesses
J. S. Boone
A. J. Dewey

Inventor
James Oliver
per Dewey & Co
Attys

UNITED STATES PATENT OFFICE.

JAMES OLIVER, OF OPHIR, CALIFORNIA.

IMPROVEMENT IN APPARATUS FOR AMALGAMATING GOLD AND SILVER.

Specification forming part of Letters Patent No. 132,919, dated November 12, 1872; antedated November 2, 1872.

*To all whom it may concern:*

Be it known that I, JAMES OLIVER, of Ophir, county of Placer, State of California, have invented an Improved Amalgamator; and I do hereby declare the following description and accompanying drawing are sufficient to enable any person skilled in the art or science to which it most nearly appertains to make and use my said invention or improvements without further invention or experiment.

My invention relates to an improvement in the art of amalgamating the precious metals; and it consists in the employment of an inclined revolving amalgamating pan; the object being to provide a means of continually presenting a fresh surface of quicksilver to the pulp, and thereby prevent any particles of the metal from escaping on account of the coating of the amalgamated surface by the base compounds generally contained in quartz.

In order to more fully illustrate and describe my invention, reference is had to the accompanying drawing forming a part of this specification.

Figure 1:
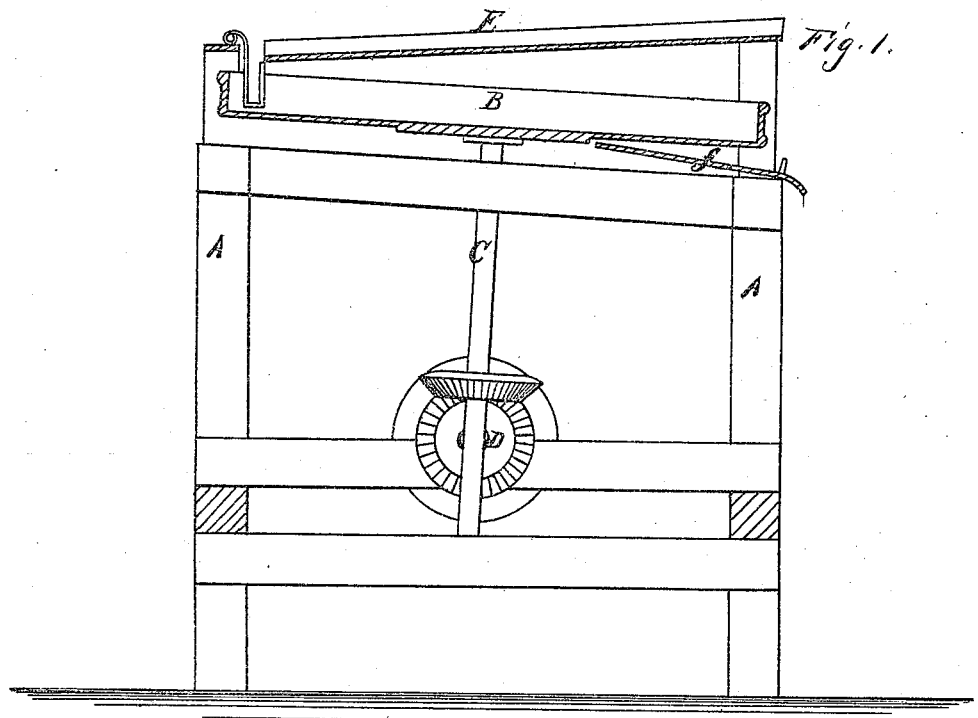
Figure 2:
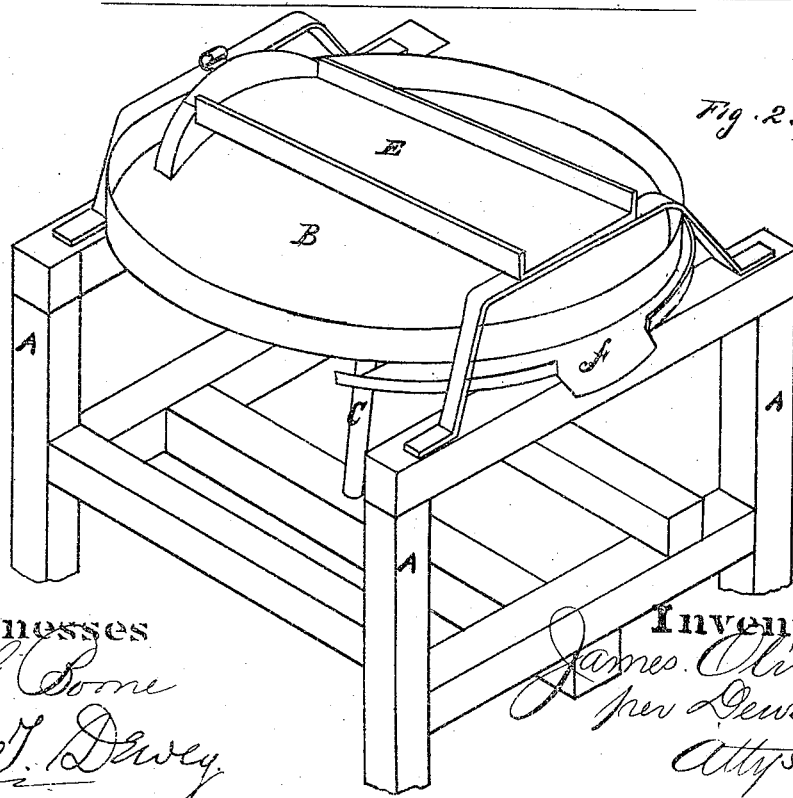

Figure 1 is a side elevation of my amalgamator. Fig. 2 is a perspective view.

A represents a suitable frame, upon which a pan, B, is mounted. This pan is made of any metal capable of being amalgamated, such as copper, iron, or zinc, and is placed at a sufficient inclination to cause the quicksilver which is placed in it to flow to the lower side of the pan and extend to about the middle line of the bottom when the lower surface is even with the top of the rim. The pan is so mounted that it can be revolved in this position by suitable means, always keeping the body of quicksilver at the lower side. In the present instance I have represented the pan as mounted upon the upper end of a shaft, C, which stands at an angle in order to give the pan the desired or requisite inclination, and is revolved by means of bevel-gears from the horizontal shaft D; but numerous methods of mounting and operating the pan can be employed. E is a trough which extends to the upper side of the pan, through which the pulp will be conveyed and delivered upon the amalgamated surface. As the pan revolves the body of quicksilver will remain at the lowest part of the pan, while a continual fresh amalgamated surface will be presented to the pulp. The movement of the pan also keeps the body of quicksilver in motion and prevents it from becoming coated. The pulp, as it strikes the amalgamated surface, spreads over the upper part of the pan and passes over the body of quicksilver in the lower part before overflowing the rim of the pan. An apron or inclined plate, $f$, with upturned edge, extends below and beyond the lower end of the pan, and catches the tailings as they overflow the rim, and directs them to a spout or sluice, through which they are carried away. The pan can be either revolved continually or at intervals, as desired.

By this means I provide an amalgamator which will be self-acting, always presenting a fresh surface of quicksilver to the flowing pulp, and thus insuring complete amalgamation.

Having thus described my invention, what I claim, and desire to secure by Letters Patent, is—

1. The amalgamating-pan B, containing metallic mercury, placed at an inclination, and revolving so that the mercury remains substantially at one point of the circumference of the revolution and is subject to continual agitation.

2. In combination with the inclined revolving amalgamating-pan B, the trough E when arranged to deliver the pulp upon the upper or amalgamated portion of the bottom of the pan, substantially as and for the purpose above described.

In witness whereof I have hereunto set my hand and seal.

JAMES OLIVER. [L. S.]

Witnesses:
  A. T. DEWEY,
  ARTHUR L. HARRIS.